(12) United States Patent
Rodbro et al.

(10) Patent No.: US 8,259,570 B2
(45) Date of Patent: Sep. 4, 2012

(54) SYSTEMS AND METHODS FOR CONTROLLING PACKET TRANSMISSION FROM A TRANSMITTER TO A RECEIVER VIA A CHANNEL THAT EMPLOYS PACKET QUEUING WHEN OVERLOADED

(75) Inventors: Christoffer Asgaard Rodbro, Stockholm (SE); Soren Vang Andersen, Aalborg (SE); Koen Vos, San Francisco, CA (US)

(73) Assignee: Skype, Dublin (IE)

( * ) Notice: Subject to any disclaimer, the term of this patent is extended or adjusted under 35 U.S.C. 154(b) by 187 days.

(21) Appl. No.: 12/455,908

(22) Filed: Jun. 9, 2009

(65) Prior Publication Data
US 2010/0150171 A1    Jun. 17, 2010

(30) Foreign Application Priority Data
Dec. 11, 2008   (GB) .................................. 0822620.1

(51) Int. Cl.
*H04L 12/56*   (2006.01)
(52) U.S. Cl. ........................................ 370/230; 370/468
(58) Field of Classification Search .................. 370/230, 370/231
See application file for complete search history.

(56) References Cited

U.S. PATENT DOCUMENTS

| | | | |
|---|---|---|---|
| 7,020,791 B1 * | 3/2006 | Aweya et al. .................. | 713/400 |
| 7,559,078 B2 * | 7/2009 | Zhang et al. .................... | 725/95 |
| 7,778,179 B2 | 8/2010 | Ekelin et al. | |
| 2002/0044528 A1 | 4/2002 | Pogrebinsky et al. | |
| 2004/0184449 A1 | 9/2004 | Sreejith et al. | |
| 2005/0159894 A1 | 7/2005 | Intriligator et al. | |
| 2007/0081561 A1 | 4/2007 | Heninger et al. | |
| 2007/0115849 A1 * | 5/2007 | Ekelin et al. .................. | 370/252 |
| 2009/0164657 A1 | 6/2009 | Li et al. | |
| 2010/0208732 A1 | 8/2010 | Rodbro et al. | |
| 2010/0220629 A1 | 9/2010 | Chang et al. | |

FOREIGN PATENT DOCUMENTS

| | | |
|---|---|---|
| KR | 2006-0012418 | 2/2006 |
| WO | WO 2005/009019 A2 | 1/2005 |
| WO | WO 2007/129134 A1 | 11/2007 |

OTHER PUBLICATIONS

International Search Report for Application No. GB0822620.1, dated Mar. 2, 2009, 1 page.

(Continued)

*Primary Examiner* — Huy D Vu
*Assistant Examiner* — Benjamin Lamont

(57) ABSTRACT

The invention provides a method of controlling transmission of packets from a transmitter to a receiver via a channel, and a corresponding transmitter and receiver. The method comprises: transmitting packets from a queue, each packet having a packet size based on data in the packet; determining a transmission time for each packet, based on a transmission clock; determining a reception time of each packet, based on a reception clock; supplying to an estimation function successive sets of observations including in each set transmission time, reception time and packet size, the estimate function being arranged to provide an estimate of bandwidth for the channel using the relationship between the bandwidth, the amount of data in the queue, packet size and the delay between transmitting successive packets from the queue; and using the estimated bandwidth to control transmission of packets.

21 Claims, 2 Drawing Sheets

OTHER PUBLICATIONS

Dovrolis, C., et al., "Packet-Dispersion Techniques and a Capacity-Estimation Methodology," *IEEE/ACM Transactions on Networking* 12(6):963-977 (2004).

Jain, M. and Dovrolis, C., "End-to-End Available Bandwidth: Measurement Methodology, Dynamics, and Relation With TCP Throughput," *Computer Communication Review, ACM*, New York, NY 32(4):295-308 (2002).

Park, K-Joon, et al. "Stochastic Analysis of Packet-Pair Probing for Network Bandwidth Estimation," *Computer Networks* 50:1901-1915 (2006).

Notification of Transmittal of the International Search Report (ISR) and the Written Opinion (WO) of the International Searching Authority, or the Declaration, with the ISR and WO, PCT/EP2009/066870, mailed Mar. 26, 2010.

Notification of Transmittal of the International Search Report and the Written Opinion of the International Searching Authority, or the Declaration, PCT/EP2009/067002, Date of Mailing: Mar. 23, 2010, 20 pp.

Office Action, U.S. Appl. No. 12/636,156, Mail Date Oct. 31, 2011.

* cited by examiner

SYSTEMS AND METHODS FOR CONTROLLING PACKET TRANSMISSION FROM A TRANSMITTER TO A RECEIVER VIA A CHANNEL THAT EMPLOYS PACKET QUEUING WHEN OVERLOADED

TECHNICAL FIELD

The present invention relates to controlling packet transmission, and in particular to estimation of bandwidth capacities of receivers and transmitters in a packet-based communications system. The invention is particularly but not exclusively related to real-time IP communication systems.

BACKGROUND

A number of methods exist for estimating bandwidth, and can be categorised in the following three groups:

"Max throughput"—a channel is loaded with data until increased one-way delay, packet round-trip time RTT, and/or loss is observed. The bandwidth is the maximum load that goes through without problems.

"Relative delay"—packets of different sizes are sent and their individual RTTs/delays are measured. Assuming that one-way transmission times equal packet sizes divided by bandwidth, the bandwidth can be estimated from the slope of the observed (packet size, RTT/delay) graph. The packets must be transmitted with a large interval to avoid network queuing, which would otherwise obscure the measurements. Typically, RTTs are employed instead of one-way delays because of the unknown clock offset between transmitter and receiver. In a modified version, two packets are sent back-to-back meaning that the last one will always be queued behind the first one, and the bandwidth can be determined from the difference in the two packets' RTTs/delays. For a surveillance of such methods, see e.g. http://vbn.aau.dk/fbspretrieve/6189553/Available_Bandwidth_Estimation.pdf.

SUMMARY

Both of the above methods rely on RTT. When a packet k is transmitted, the transmitter notes the time of transmission, Tx(k). When a receiver receives the packet, it feeds back another packet to the transmitter containing an identifier for k. The transmitter then finds the RTT=Tfb(k)−Tx(k), where Tfb(k) is the time of arrival of the feedback.

"Blackbox methods"—from a database of generic observable parameters and known bandwidths, a statistical model is built to describe bandwidths as a function of the observables. For example, the model can be a neural network. By feeding the trained model with a set of observables for a network with unknown bandwidth, it can then return an estimate of the bandwidth.

A different but related problem is that of network rate control for which a widespread method is the "Additive increase, multiplicative decrease" mechanism by Jacobson [V Jacobson, "Congestion avoidance and Control", 1988]. Typically, such methods are not based on capacity estimation as such, but instead seek to reach an equilibrium or trade-off between different performance parameters such as loss, roundtrip time, and transmission rate. Such approaches typically lead to varying transmission rates and occasional loss and jitter, making them of limited use for strict real-time applications.

"Max through-put" and "Relative delay" methods both suffer from the problem that they require modification of the network load to estimate the bandwidth. Moreover, "Max through-put" in effect requires an overload of the channel, obstructing other simultaneous traffic.

RTT-based methods suffer from the additional problem that the feedback may be delayed itself, severely impacting the estimation.

"Blackbox methods" are appealing in that they do not suffer from the above-mentioned problems; unfortunately, the generic input does not in general provide sufficient information for precise bandwidth estimation, making the method inadequate for most applications, including rate control.

It is an aim of the present invention to mitigate the problems discussed above.

One aspect of the invention provides a method of controlling transmission of packets from a transmitter to a receiver via a channel, the method comprising:
  transmitting packets from a queue, each packet having a packet size based on data in the packet;
  determining a transmission time for each packet, based on a transmission clock;
  determining a reception time of each packet, based on a reception clock;
  supplying to an estimation function successive sets of observations including in each set transmission time, reception time and packet size, said estimate function arranged to provide an estimate of bandwidth for the channel using the relationship between the bandwidth, the amount of data in the queue, packet size and the delay between transmitting successive packets from the queue; and
  using the estimated bandwidth to control transmission of packets.

In the particularly preferred embodiment, the relationship used by the estimation function is:

$$N(k,i) = \max(N(k-1,i) + CT(k,i) - (Tx(k,i) - Tx(k-1,i)) * BW(i), 0) + S(k,i)$$

where $N(k,i)$ is the amount of data in the channel packet queue at time $Tx(k,i)$, BW is the bandwidth, $S(k,i)$ is the packet size and $CT(k,i)$ denotes any cross-traffic from the transmitter.

Another aspect of the invention provides a transmitter for transmitting packets to a receiver via a channel, the transmitter comprising:
  means associated with a queue of packets ready for transmission, each packet having a packet size based on data in the packet;
  a transmission clock for recording transmission time for each packet;
  means for receiving a reception time for each packet, based on a reception clock located at the receiver; and
  an estimation function arranged to receive successive sets of observations including in each set transmission time, reception time and packet size, said estimation function arranged to provide an estimate of the bandwidth of the channel using the relationship between the bandwidth, the amount of data in the queue, packet size and the delay between transmitting successive packets from the queue. The means associated with a queue at the transmitter can be a store of a queue at the transmitter or means for despatching packets from a network queue.

A third aspect of the invention provides a receiver arranged to receive packets transmitted from a transmitter via a channel, the receiver comprising:
  means for determining a transmission time for each packet based on information received with the packets;
  a reception clock for determining a reception time for each packet; and an estimation function arranged to receive successive sets of observations including in each set transmission time, reception time and packet size, said estimation function arranged to provide an estimate of the bandwidth for the channel using the relationship between the bandwidth, the amount of data in a queue of packets, packet size and the delay between transmitting successive packets from the queue.

A particularly noteworthy feature of the described embodiments of the present invention is the fact that the bandwidth estimation is based on observation of one way transmission delays. Thus, it is not subject to the difficulties associated with RTT-based methods. By using the techniques described herein, it can effectively be determined if congestion problems are in one or another direction.

The invention is applicable for one-to-one and multicasting scenarios. In multicasting scenarios, the method can effectively estimate separate and possibly different up and downlink capacities of each node in a network.

Moreover, because a queuing model is employed, the methods discussed herein provide an estimate of bandwidth from whatever traffic is actually sent, and can thus work directly on ongoing traffic due to, for example, real-time applications.

The estimated bandwidth can be used to control transmission of packets in a number of different ways. Real-time rate control can be implemented, or overlay network topology selection can be based on the estimated bandwidth. As compared to the dedicated rate control mechanism discussed above for example in Jacobson, the methods described herein provide an actual bandwidth estimate making it useful in a wider range of applications.

For a better understanding of the present invention and to show how the same may be carried into effect, reference will now be made by way of example to the accompanying drawings in which:

DETAILED DESCRIPTION

Figure 1:
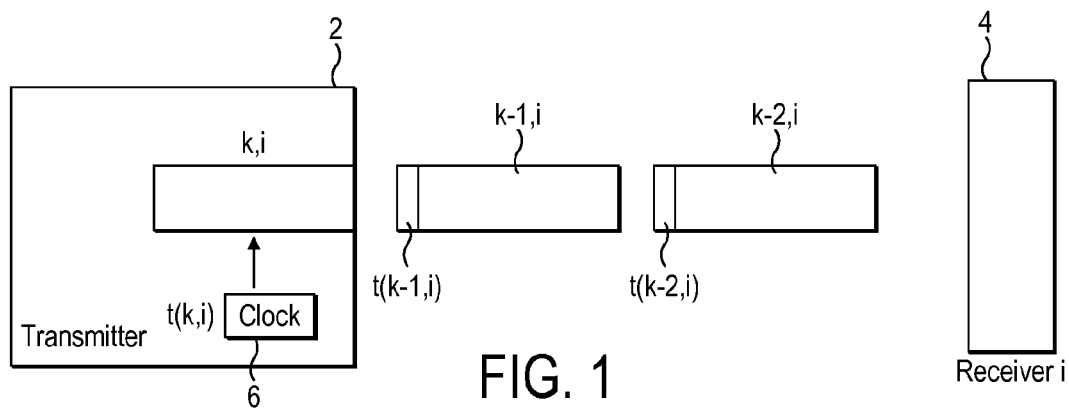
FIG. 1 is a schematic diagram illustrating flow of packets between a transmitter and a receiver.

FIG. 1 is a highly schematised diagram illustrating the flow of packets between a transmitter 2 and a particular receiver 4, the receiver being denoted i. In the packet stream, the sequence numbers of the packets are denoted using k. FIG. 1 illustrates a packet (k,i) about to be transmitted, and the two preceding packets already having been transmitted. The packets are conveyed from the transmitter to the receiver over a channel with a certain bandwidth. The transmitter 1 has a clock 6 which is used to provide timing information associated with transmitted packets. This can be in the form of timestamps within each packet, or can be provided as additional side information, preferably piggybacked to the packet in question. This is shown schematically in FIG. 1 where the side information is denoted t(k,i) for the sequence number k of the appropriate packet. The transmission time of a packet with sequence number k in a stream going to recipient i is denoted by Tx(k,i) and is the clock reading. Where timestamps are not provided, side information t(k,i) is encoded and quantised as described below.

Figure 2:
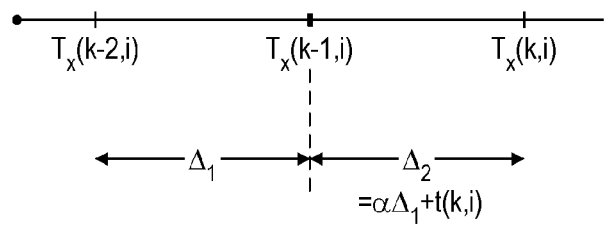
FIG. 2 is a timing diagram.

FIG. 2 is a timing diagram illustrating how in one particular embodiment the transmission time Tx(k,i) can be recursively recovered at the receiver side. It can be seen from FIG. 2 that transmission time Tx(k,i) is a delay $\Delta_2$ after the transmission time of the preceding packet Tx(k−1,i). Generally, the delay between packets is near constant, that is $\Delta_2$ is more or less equal to $\Delta_1$, the delay between the earlier two preceding packets. Thus, an estimate for $\Delta_2$ can be obtained by the following:

$$\alpha(Tx(k-1,i)-Tx(k-2,i))$$

where $\alpha$ is less than or equal to 1. Then, $$Tx(k,i)=Tx(k-1,i)+\Delta_2+t(k,i).$$

The t(k,i) is calculated, quantised and transmitted, allowing Tx(k,i) to be recursively recovered from the following equation:

$$Tx(k,i)=Tx(k-1,i)+\alpha(Tx(k-1,i)-Tx(k-2,i))+t(k,i).$$

Figure 3:
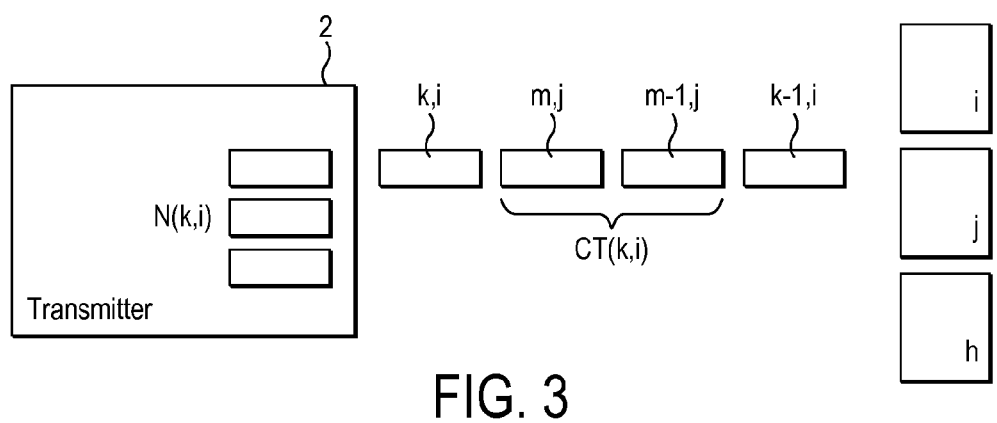
FIG. 3 is a highly schematised diagram illustrating cross-traffic between a transmitter and multiple receivers.

For use in multicast scenarios, the amount of cross traffic must be encoded, quantised and transmitted along with the outgoing packet stream. FIG. 3 illustrates the concept of cross traffic which is the amount of traffic sent to other recipients than the recipient of one particular packet stream. FIG. 3 illustrates three recipients, receiver i, receiver j, receiver h, i and j of which are receiving packets from transmitter 2.

One particular definition of cross-traffic for packet k of recipient i is:

$$CT(k,i)=\text{sum}_{m,j}(S(m,j)), \text{ with } m \neq k \text{ and}$$
$$Tx(k-1,i)<Tx(m,j)<Tx(k,i) \qquad \text{Equation (1)}$$

where S(m,j) is the size of packet m going to recipient j. This is the amount of data sent to other recipients in between packets k−1 and k for recipient i. The CT(k,i) cross-traffic can be encoded in various ways, for example relative to S(k,i) or relative to an estimate of the total channel capacity.

In order to describe a technique for estimating the bandwidth between two nodes in a 1 to 1 connection (that is, the transmitter 2 and receiver 4, reference will now be made to FIG. 4 which incorporates an estimation function at the receiver side.

Figure 4:
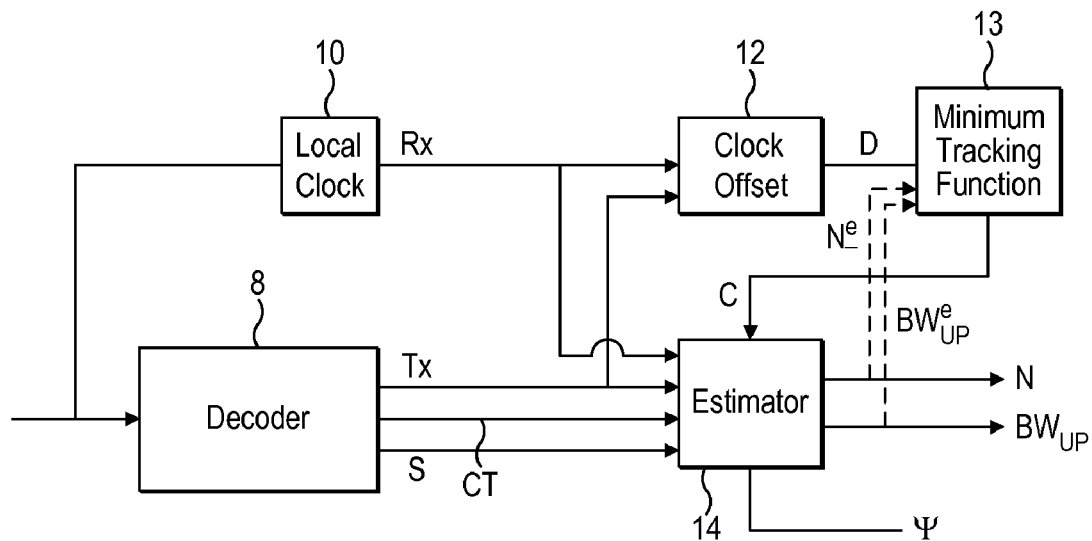
FIG. 4 is a schematic block diagram of circuitry at a receiver to implement one embodiment of the invention.

FIG. 4 illustrates a schematic block diagram of functional blocks at the receiver 4. A decoder 8 receives a packet and decodes the encoded side information about transmission time to obtain an estimate of the transmission time of the packet Tx(k,i). Also, a local clock 10 provides a reading denoting the arrival time of the packet, Rx(k,i). From these two quantities, it is possible to compute the raw packet delay:

$$D(k,i)=Rx(k,i)-Tx(k,i)$$

A separate calculation function 12 can be provided for this in certain embodiments for clock offset. It will be appreciated that it is effectively taken into account in any event in the following analysis.

Of course, D(k,i) is not an accurate measurement of the actual transmission delay, because Rx(k,i) and Tx(k,i) are measured with respect to different, non-synchronised clocks. D(k,i) can be described by:

$$D(k,i)=Dx(k,i)+c(k,i)$$

where Dx(k,i) is the true delay and c(k,i) is the measurement error due to clocks not being synchronised. The assumption is made herein that although c(k,i) is unknown, it is close to constant over time.

The receiver 4 includes an estimation function 14 which receives a series of observations for each of Tx(k,i), Rx(k,i), CT(k,i) and S(k,i). It will be appreciated that CT(k,i) is encoded, quantised and transmitted with the packet stream. S(k,i) is readily available in any pcket based system: it is the total packet sizes (e.g. in bytes) which is required for meaningful reception of data typically, it is in the IP header. These observations are used to provide estimates for the bandwidth of the channel on the uplink $BW_{UP}(i)$, the amount of data N(k,i) in the channel packet queue at time Tx(k,i), and the measurement error due to clocks not being synchronised, c(k,i). The estimation is based on the following theory.

Assume that the total outgoing packet stream of the transmitter is limited by a channel with bandwidth $BW_{UP}(i)$, and that this channel employs packet queueing when overloaded. Thus we write:

$$Dx(k,i)=N(k,i)/BW_{UP}(i)+e(k,i)$$

or equivalently, $$D(k,i)=N(k,i)/BW_{UP}(i)+c(k,i)+e(k,i) \quad \text{Equation (2)}$$

Here, N(k,i) is the amount of data in the channel packet queue at time Tx(k,i), i.e., immediately after packet (k,i) is loaded on the channel. That is, the true transmission delay of a packet is determined by the amount of traffic that must be transmitted, divided by the channel transmission speed. e(k,i) is measurement noise, due to quantization noise in Tx(k,i) and channel disturbances.

In turn we can write:

$$N(k,i)=\max(N(k-1,i)+CT(k,i)-(Tx(k,i)-Tx(k-1,i))*BW_{UP}(i),0)+S(k,i) \quad \text{Equation (3)}$$

where we assume a steady loading of the cross traffic CT(k,i) over the time interval [Tx(k−1,i),Tx(k,i)]. Equation (3) says that prior to loading packet (i,k), the amount of traffic in the channel packet queue equals:

what was there last time we put a packet
minus what the channel was able to process since then
plus any cross traffic added in the same interval
and that the amount of traffic can never become negative.

The estimator uses equations (2) and (3) for estimating $BW_{UP}(i)$, N(k,i) and c(k,i) using the series of observations which are supplied to the estimator by Tx(k,i), Rx(k,i), CT(k,i) and S(k,i).

One implementation for the estimator 14 is to see the equations as the basis for a Kalman filter, and solve them as an extended, unscented or particle Kalman filter. The preferred implementation applies an unscented Kalman filtering. One advantage of Kalman filtering is that it readily provides error covariance matrices R(i) for the estimates of $BW_{UP}(i)$, N(k,i), as well as t-test statistics T(i) for the validity of the model from which equations (2) and (3) are derived. This extra information provides insight about the confidence of the resulting estimates, providing estimate confidences $\psi$.

A Kalman filter allows the equations to be solved in a recursive fashion for each set of observations. It would be possible to use other methods of recursive calculation. Alternatively, it would be possible to store values for the observations over a period of time and use successive sets to solve the equation by numerical analysis.

Figure 5:
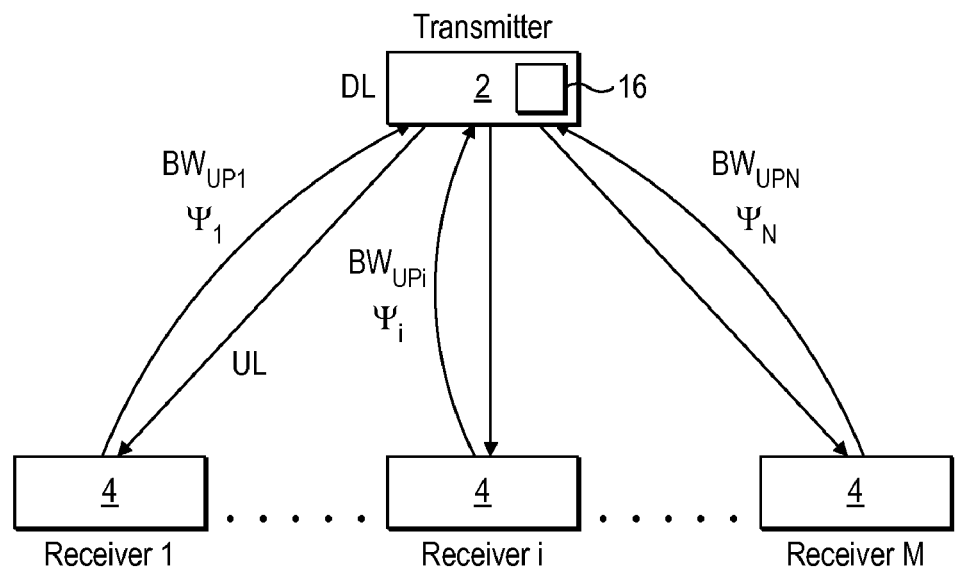
FIG. 5 is a schematic block diagram of a multicast scenario.

In a multicast scenario as illustrated diagrammatically in FIG. 3, and more particularly in FIG. 5, all or some of the plurality of receivers may execute the algorithm in an estimator. FIG. 5 illustrates schematically a plurality of receivers, receiver 1 ... receiver i ... receiver M. Each receiver receives packets from the transmitter 2. At least some of the receivers execute the algorithm described in equation 3 in an estimator as described above which generates estimates for the uplink bandwidth at each receiver, together with estimated confidences $\phi$. As mentioned above, the estimated confidences can be based on the co-variances R(i) and t-test statistics T(i) generated by the Kalman filter.

In that case, the transmitter 2 can execute a weighted averaging function 16 which averages received multiple estimates $BW_{UP}(1)$, $BW_{UP}(i)$, $BW_{UP}(M)$, etc, weighted using the estimated confidences $\phi(1)$, $\phi(i)$, $\phi(M)$ respectively to generate one estimate for the uplink bandwidth. By feeding back the estimate confidences to the transmitter 4, the individual estimates can be combined into one according to:

$$BW_{UP}=\operatorname{sum}_i(BW_{UP}(i)*f(\psi(i)))/\operatorname{sum}_i(f(\psi(i))),$$

where f denotes a function of $\psi$.

It is possible to improve operation of the estimator by eliminating the clock error c(k,i) from equation 2 Reverting to FIG. 4, the calculation function 12 is illustrated which receives values for Tx(k,i) and Rx(k,i) and calculates the perceived delay D(k,i) for each set of observations. A minimum tracking function 13 observes the one way delays D(k,i) to generate an estimated compensation for the clock c(k,i). In one embodiment, the minimum tracking function 13 is implemented as a Kalman filter which models c(k,i) as a first order model to grasp any clock drift. Minimum tracking is obtained by employing higher observation noise in the Kalman filter for higher values of D(k,i). The estimated clock offset c is supplied to the estimator 14 which can then internally subtract the clock offset c(k,i) from D(k,i). This allows the clock offset to be removed from the Kalman filter state, effectively decoupling errors in c(k,i) from estimates of BW(k,i) and N(k,i), which may accumulate due to imperfections in the handling of the non-linearity of equation 3. Moreover, reducing the state reduces computational complexity of the Kalman filter.

In an improved version, the delays D(k,i) are first compensated for expected network delay, so that the minimum of $D(i,k)-[N(k,i)]^e/[BW_{UP}(i)]^e$, where $[N(k,i)]^e$ and $[BW_{UP}(i)]^e$ denote current estimates of N(k,i) and $BW_{UP}(i)$ respectively, is tracked.

It will readily be appreciated that in a one-to-one communication case, there is no cross traffic and so CT(k,i) is constantly 0 and there is no need to supply it to the estimator.

The estimated bandwidth $BW_{UP}$ is transmitted from the receiver 4 to the transmitter 2 and can then be used by the transmitter to manage uplink bandwidth resources.

For estimation of the downlink bandwidth (bandwidth of the channel at the receiver), a similar estimator can be applied but the calculation of the cross traffic term CT is different. In this case, it is not decoded from an encoded amount sent with the packet stream, but is determined by picking one reference transmitter and calculating the cross traffic as the amount of data received from other transmitters in between packets k,i and k from the reference transmitter. Referring to FIG. 3, as an example, the receiver labelled i could receive packets not only from the illustrated transmitter 2 but from other (non-illustrated) transmitters.

In an alternative embodiment of the invention the bandwidth estimator is implemented in the transmitter. In this case the information (Rx) relating to the reception of the data packets is transmitted from the receiver to the transmitter, to be utilised in estimation at the transmitter.

The invention claimed is:
1. A method of controlling transmission of packets from a transmitter to a receiver via a channel which employs packet queuing when overloaded, the method comprising:

transmitting packets in a packet stream of ongoing traffic, each packet containing data and indicating a packet size based on data in the packet;

determining a transmission time for each packet, based on a transmission clock;

determining a reception time of each packet, based on a reception clock;

supplying to an estimation function successive sets of observations including in each set transmission time, reception time and packet size;

said estimate function arranged to provide from the ongoing traffic an estimate of bandwidth for the channel by employing a queuing model for the channel, the estimate function using the relationship between an estimate of the bandwidth, an estimate of the amount of data in a channel packet queue, packet size and the delay between transmitting successive packets in the packet stream; and using the estimated bandwidth to control transmission of packets.

2. A method according to claim 1, wherein the relationship used by the estimation function is:

$$N(k,i)=\max(N(k-1,i)+CT(k,i)-(Tx(k,i)-Tx(k-1,i))*BWUP(i),0)+S(k,i)$$

where $N(k,i)$ is the amount of data in the channel packet queue at time $Tx(k,i)$, BWUP is the uplink bandwidth, $S(k,i)$ is the packet size and $CT(k,i)$ denotes any cross-traffic from the transmitter.

3. A method according to claim 1, wherein the transmission time for each packet is conveyed with the packet as a timestamp.

4. A method according to claim 1, wherein the transmission time for each packet is recovered at the receiver based on time-related side information transmitted with each packet.

5. A method according to claim 1, wherein the step of supplying the sets of observations to the estimation function is carried out at the receiver.

6. A method according to claim 1, comprising the step of supplying the reception time from the receiver to the transmitter, wherein the step of the supplying the sets of observations to the estimation function is carried out at the transmitter.

7. A method according to claim 1, wherein the estimation function operates on the sets of observations in a recursive fashion.

8. A method according to claim 7, wherein the estimation function is a Kalman filter.

9. A method according to claim 1, comprising the step of estimating a clock error between the transmission clock and the reception clock, and filtering the clock error to simplify operation of the estimation function.

10. A method according claim 1, when used to provide an estimate of uplink bandwidth.

11. A method according claim 1, when used to provide an estimate for downlink bandwidth.

12. A transmitter for transmitting packets to a receiver via a channel in a stream of ongoing traffic transmitted from a transmitter via a channel, the transmitter comprising:

means for transmitting packets in a packet stream of ongoing traffic, each packet containing data and indicating a packet size based on data in the packet;

a transmission clock for recording transmission time for each packet;

means for receiving a reception time for each packet, based on a reception clock located at the receiver; and an estimation function arranged to receive successive sets of observations including in each set transmission time, reception time and packet size, said estimation function arranged to provide from the ongoing traffic an estimate of bandwidth for the channel by employing a queuing model for the channel, the estimate function using the relationship between an estimate of the bandwidth, an estimate of the amount of data in a channel packet queue, packet size and the delay between transmitting successive packets in the packet stream.

13. A transmitter according to claim 12, wherein the relationship used by the estimation function is:

$$N(k,i)=\max(N(k-1,i)+CT(k,i)-(Tx(k,i)-Tx(k-1,i))*BWUP(i),0)+S(k,i)$$

where $N(k,i)$ is the amount of data in the channel packet queue at time $Tx(k,i)$, BWUP is the uplink bandwidth, $S(k,i)$ is the packet size and $CT(k,i)$ denotes any cross-traffic from the transmitter.

14. A transmitter according to claim 12, comprising means for calculating cross-traffic from the transmitter to a plurality of other receivers.

15. A receiver arranged to receive packets in a stream of ongoing traffic transmitted from a transmitter via a channel, the receiver comprising:

means for determining a transmission time for each packet based on information received with the packets;

a reception clock for determining a reception time for each packet; and an estimation function arranged to receive successive sets of observations including in each set transmission time, reception time and packet size, said estimation function arranged to provide from the ongoing traffic an estimate of the bandwidth for the channel by employing a queuing model for the channel, the estimate function using the relationship between an estimate of the bandwidth, an estimate of the amount of data in a channel packet queue, packet size and the delay between transmitting successive packets in the packet stream.

16. A receiver according to claim 15, comprising means for minimum tracking the delay between transmitting successive packets from the queue, for determining an estimate of clock error between a transmission clock, for determining transmission times for the packets at the transmitter, and the reception clock.

17. A receiver according to claim 15, comprising means for calculating cross-traffic received from a plurality of other transmitters.

18. A receiver according to claim 15, wherein the relationship used by the estimation function is:

$$N(k,i)=\max(N(k-1,i)+CT(k,i)-(Tx(k,i)-Tx(k-1,i))*BWUP(i),0)+S(k,i)$$

where $N(k,i)$ is the amount of data in the channel packet queue at time $Tx(k,i)$, BWUP is the uplink bandwidth, $S(k,i)$ is the packet size and $CT(k,i)$ denotes any cross-traffic from the transmitter.

19. A method of controlling transmission of packets from a transmitter to a receiver via a channel, the method comprising:

transmitting packets from a queue, each packet having a packet size based on data in the packet;

determining a transmission time for each packet, based on a transmission clock;

determining a reception time of each packet, based on a reception clock;

supplying to an estimation function successive sets of observations including in each set transmission time, reception time and packet size, said estimate function arranged to provide an estimate of bandwidth for the channel using the relationship between the bandwidth, the amount of data in the queue, packet size and the delay between transmitting successive packets from the queue; and using the estimated bandwidth to control transmission of packets;

wherein the relationship used by the estimation function is $N(k,i)=\max(N(k-1,i)+CT(k,i)-(Tx(k,i)-Tx(k-1,i))*BWUP(i),0)+S(k,i)$ where $N(k,i)$ is the amount of data in the channel packet queue at time $Tx(k,i)$, BWUP is the uplink bandwidth, $S(k,i)$ is the packet size and $CT(k,i)$ denotes any cross-traffic from the transmitter.

20. A transmitter for transmitting packets to a receiver via a channel, the transmitter comprising:

means for transmitting a queue of packets, each packet having a packet size based on data in the packet;

a transmission clock for recording transmission time for each packet;

means for receiving a reception time for each packet, based on a reception clock located at the receiver; and an estimation function arranged to receive successive sets of observations including in each set transmission time, reception time and packet size, said estimation function arranged to provide an estimate of the bandwidth of the channel using the relationship between the bandwidth, the amount of data in the queue, packet size and the delay between transmitting successive packets from the queue;

wherein the relationship used by the estimation function is $N(k,i)=\max(N(k-1,i)+CT(k,i)-(Tx(k,i)-Tx(k-1,i))*BWUP(i),0)+S(k,i)$ where $N(k,i)$ is the amount of data in the channel packet queue at time $Tx(k,i)$, BWUP is the uplink bandwidth, $S(k,i)$ is the packet size and $CT(k,i)$ denotes any cross-traffic from the transmitter.

21. A receiver arranged to receive packets transmitted from a transmitter via a channel, the receiver comprising:

means for determining a transmission time for each packet based on information received with the packets;

a reception clock for determining a reception time for each packet; and an estimation function arranged to receive successive sets of observations including in each set transmission time, reception time and packet size, said estimation function arranged to provide an estimate of the bandwidth for the channel using the relationship between the bandwidth, the amount of data in a queue of packets, packet size and the delay between transmitting successive packets from the queue;

wherein the relationship used by the estimation function is $N(k,i)=\max(N(k-1,i)+CT(k,i)-(Tx(k,i)-Tx(k-1,i))*BWUP(i),0)+S(k,i)$ where $N(k,i)$ is the amount of data in the channel packet queue at time $Tx(k,i)$, BWUP is the uplink bandwidth, $S(k,i)$ is the packet size and $CT(k,i)$ denotes any cross-traffic from the transmitter.

* * * * *